March 27, 1945.　　C. A. BERGSTROM ET AL　　2,372,470
MACHINE TOOL WITH OPTICAL SYSTEM
Filed Dec. 7, 1942　　3 Sheets-Sheet 1

Inventors:
Carl A. Bergstrom
Walter C. Bergstrom
Oscar C. Hedin
Edmund W. Pennington
By: Harold Olsen
Attorney

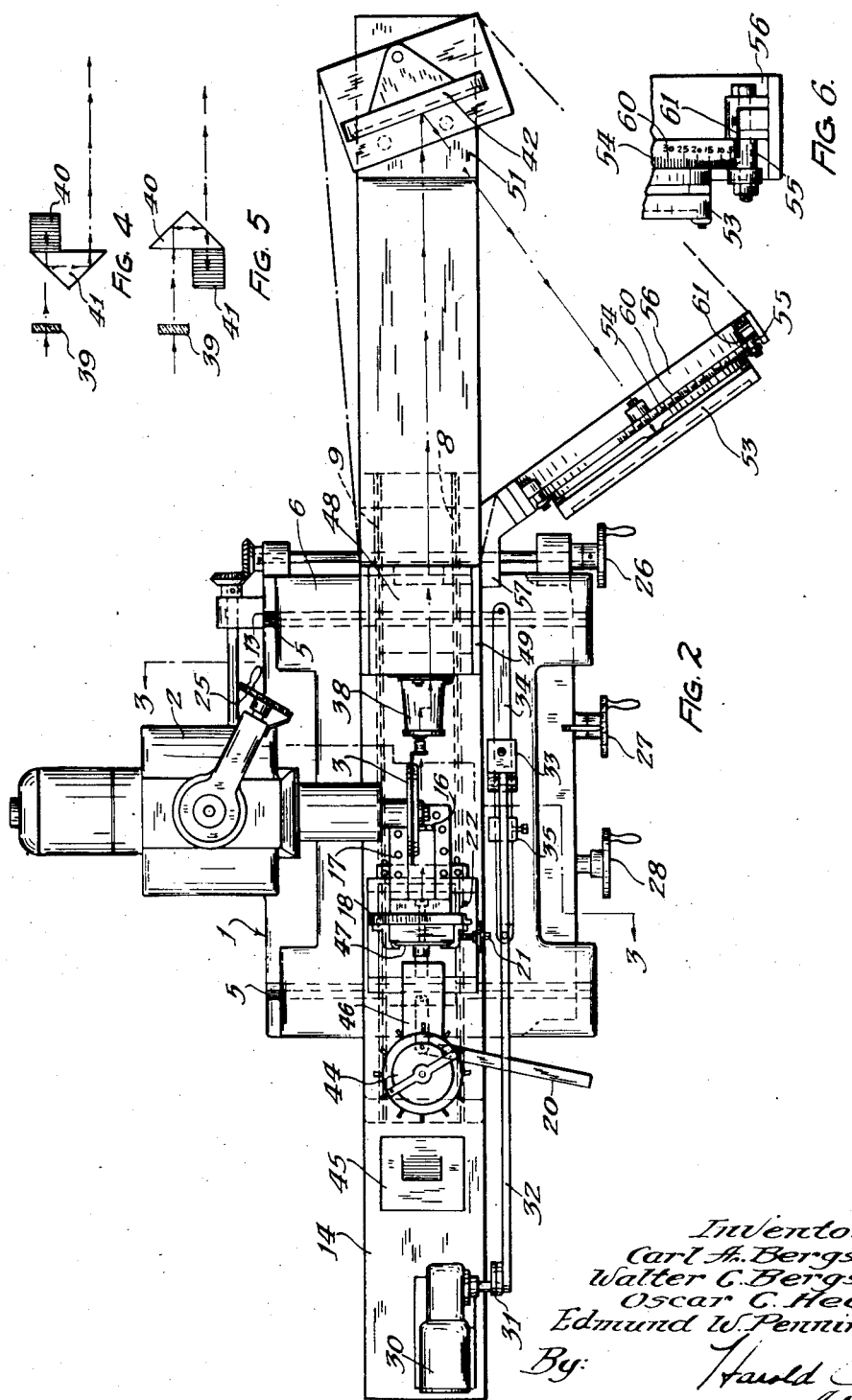

March 27, 1945.     C. A. BERGSTROM ET AL     2,372,470
MACHINE TOOL WITH OPTICAL SYSTEM
Filed Dec. 7, 1942     3 Sheets-Sheet 3

Inventors:
Carl A. Bergstrom
Walter C. Bergstrom
Oscar C. Hedin
Edmund W. Pennington
By Harold Isen
Attorney Patented Mar. 27, 1945

2,372,470

UNITED STATES PATENT OFFICE 2,372,470

MACHINE TOOL WITH OPTICAL SYSTEM

Carl A. Bergstrom, Euclid, Walter C. Bergstrom and Oscar C. Hedin, Cleveland Heights, and Edmund W. Pennington, Shaker Heights, Ohio, assignors to The Weldon Tool Company, Cleveland, Ohio, a corporation of Ohio Application December 7, 1942, Serial No. 468,118

10 Claims. (Cl. 51—165)

This invention relates to improvements in metal-working machines, and to a method and means for facilitating precision shaping, as for example by the grinding of a piece of work or by the shaping of a cutting tool. The invention includes the use of a type of device in which enlarged shadows of the work and the tool are projected onto a shadow screen, for comparison with a very much enlarged scale drawing representative of the contour which the work piece is to be given. The device is well adapted for shaping very hard metals.

An important object of the of the invention is to provide a shadow projection system including a shadow-receiving screen, all of which moves with the work or work piece during the shaping or grinding operation, and in relation to which system and to a shaping tool the work can be adjusted in various planes.

It has heretofore been a common practice in precision grinding to put the work on a grinding machine, partly grind the work, and then remove the work from the grinding machine and put it in a contour-comparing machine and inspect it to see if a magnified shadow of the work actually corresponds to an enlarged drawing on the ground glass of said comparing machine. If the work needs more grinding it is then transferred from the comparing machine to the grinding machine and an additional grinding operation performed. The present invention does away with such transfers, in that the work and the optical-comparing system are on one and the same machine.

Another and very important object of the invention is to provide an attachment as a unit, applicable to a conventional metal-working machine, which unit includes on a single base a work holder and an optical system adapted to produce and magnify a shadow of the profile of the work being shaped, and to project the magnified shadow-image onto a screen for comparison with a master profile delineation on said screen. The screen is generally constituted by a sheet of ground glass on which the master delineation is attached. Another object is to so place the screen that the operator, while within easy reach of the controls of the machine, can constantly have a clear view of the shadow in relation to the master profile delineation.

Another and specific object is to provide a unit adapted for attachment to the table of a surface grinding machine having a rotary grinding tool and to provide a unit in which the work piece is continuously in focus with a shadow-producing optical system for the purpose herein.

As used herein the word "screen" means any shadow-receiving screen usable for the purpose herein, including a screen constituted by the usual ground glass to which a suitable translucent plate having a "master" delineation thereon is ordinarily attached.

Features of the invention include the provision of a unit attachable to a conventional metal-working machine; the moving of the work and optical system in unison during the cutting operation; the particular positioning of the parts of the optical system; the arrangement of the optical system so as to substantially reduce the expense of light-excluding housings therefor; the arrangement of the screen at a point in front of the machine and immediately adjacent the front controls of the machine; the positioning of such a screen in an overhanging relation to the floor; the specific means by which reciprocation of the work and optical system during grinding is obtained; the method step of moving such a system for the purpose herein; the means for adjusting the work in three planes which are at right angles to one another, and in a circular plane; the means for circularly adjusting the shadow screen; the complemental circular adjustment of the work and screen; and all details of construction shown, along with all broader conceptions inherent in the disclosure.

Objects, features and advantages of the invention will be pointed out in the description of the drawings, and in said drawings:

Figure 2 is a top plan view of Figure 1;

Figures 4 and 5 are diagrammatic views of parts of the optical system taken at right angles to one another;

Figure 6 is a fragmentary detail top plan showing the manner of rotatably mounting the shadow-screen.

Figure 1:
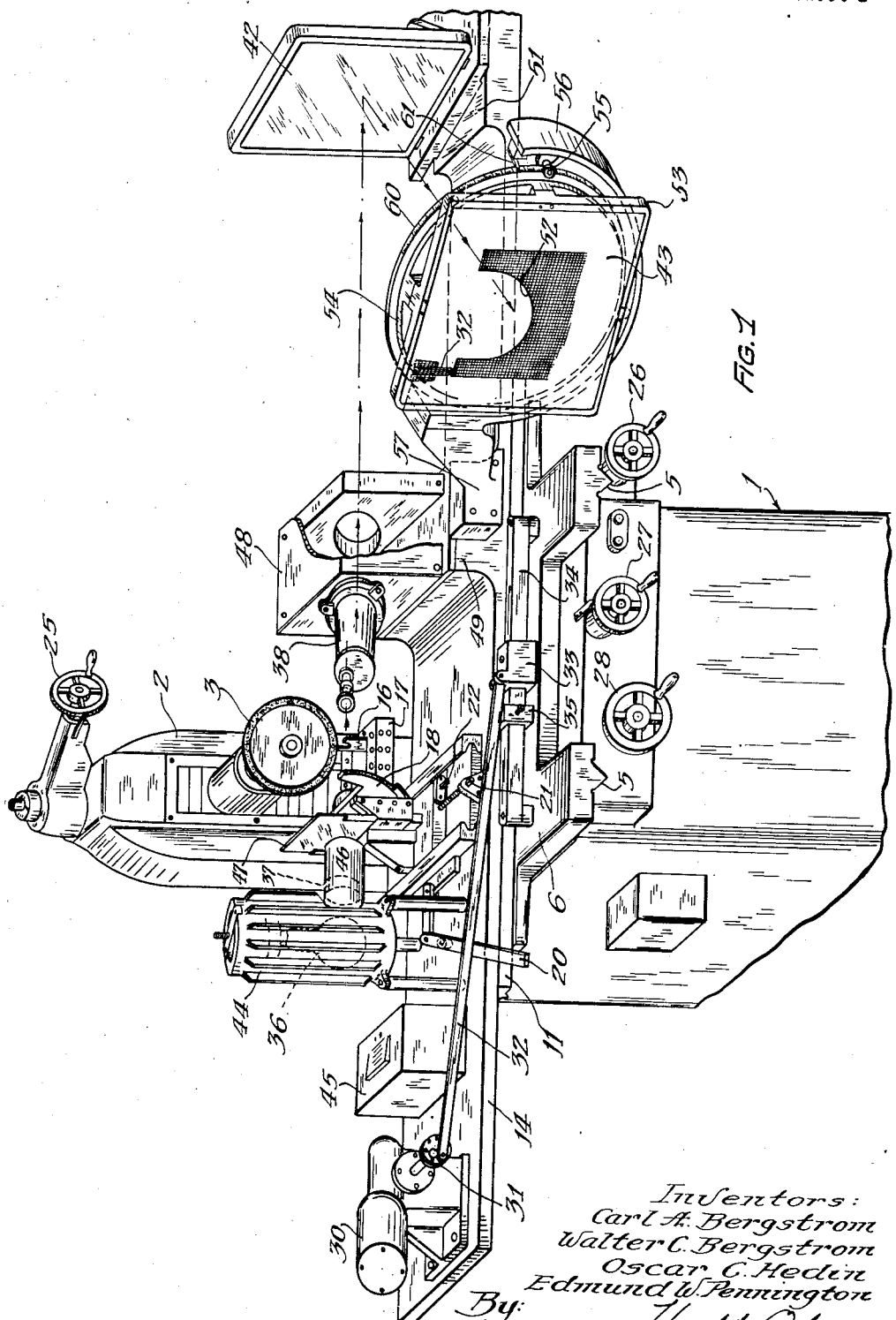
Figure 1 is a perspective view showing our invention applied as an attachment to the table of a conventional surface-grinding machine.
Figure 7:
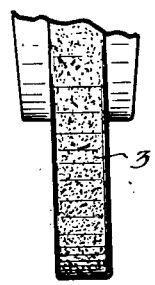
Figure 7 is an enlarged view of part of a grinding wheel usable herein.

Before entering into a detailed description of the structures of the particular embodiment of our invention shown herein, it is to be understood that one of the valuble features of this invention is that it can be manufactured as a unit adapted to be attached to a conventional machine tool. Such a use is at this time particularly valuable because of the scarcity of metal-working machines and the wherewith to make them. However, although this unit-attachment feature is particularly claimed, there is no intention to entirely limit the invention thereto because, as will be seen, there are phases of the invention which need not necessarily be limited to its use as an attachment.

Now, referring to the drawings. The numeral 1 indicates part of the frame of a conventional type of machine tool such as a grinder. Other types of metal cutting machines may be used with our invention. The frame includes an upright member 2, sometimes called the "column," and this column carries a vertically adjustable rotatable tool 3, in this instance having the form of a grinding wheel of the diamond type, rotative on a horizontal axis.

The frame 1 is provided with the usual pair of ways 5 on which a saddle 6 is slidably mounted to move in a direction from front to back of the machine or toward and away from the column 2 and in a direction parallel with the axis of the wheel 3. The saddle has a pair of ways (see Figure 3) indicated at 8 and 9 which extend at right angles to the ways 5. The ways 8 and 9 slidably cooperate with corresponding elements of the machine table 11 having T-slots 12 therein which are parallel with the ways 8 and 9. A main base 14 is attached to the table 11 by suitable bolts engaging in the T-slots 12. The base 14 extends, in this embodiment, beyond the table 11 a considerable distance at both ends and may be considered to be the means by which our invention is attached to the machine, although no limitation is intended by this statement. In this case the machine table 11 and the base 14 are reciprocated in unison. On the base 14 is supported our entire optical system and shadow-screen, the work support, and part of the means for moving or for reciprocating the machine table 11.

The work holder is mounted on the base 14 by any suitable means which will permit the holder to be adjusted relative to the base 14 in vertical, longitudinal and transverse directions, and which will also permit angular positioning or rotation of the work holder about a horizontal axis 19, which in this case is parallel with the ways 8 and 9. The work holder can thus be adjusted in three planes which are perpendicular to one another, and can also be adjusted circularly.

Figure 3:
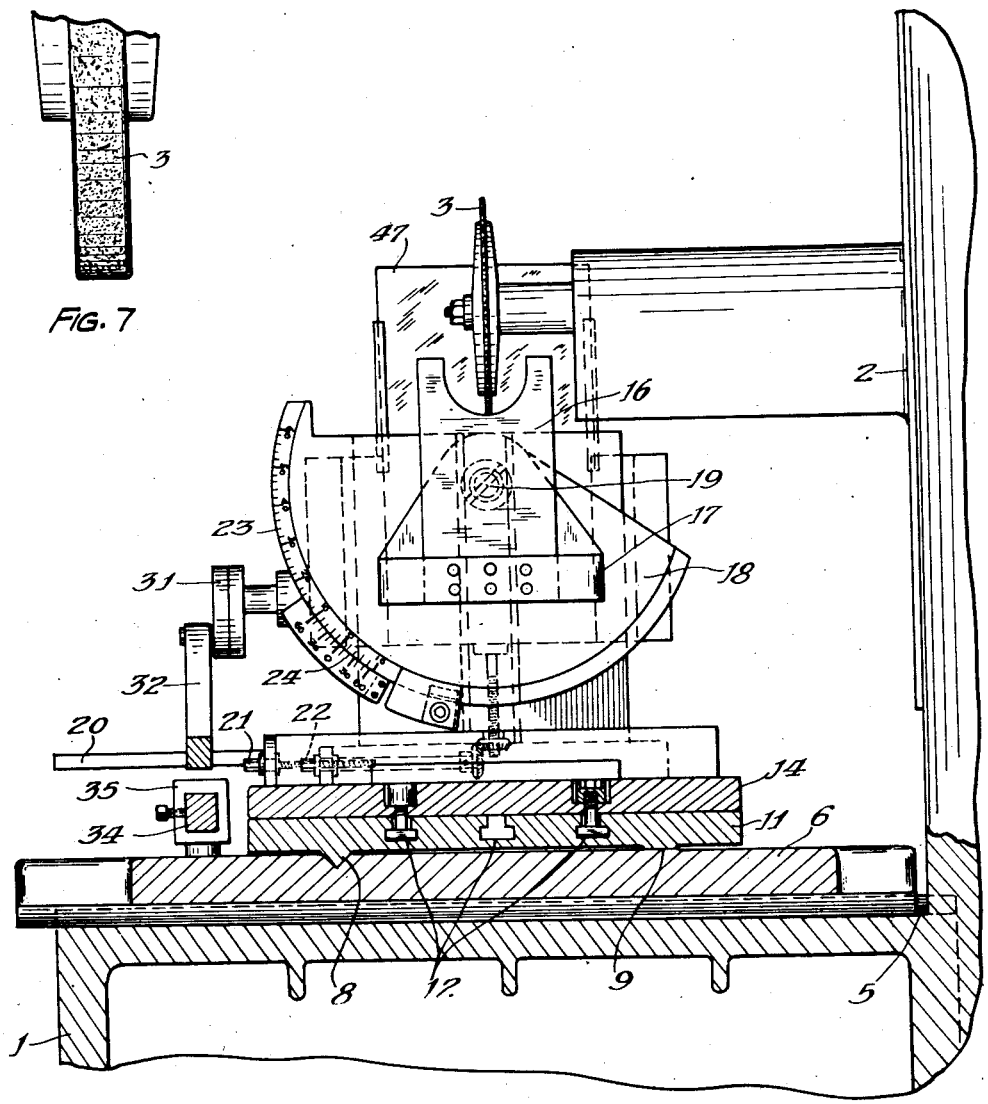
Figure 3 is a transverse section taken approximately on line 3—3 of Figure 2 looking in direction of the arrows.

Referring to Figure 3. The work or work piece is indicated at 16. The work in this instance is suitably held on a fixture 17 which projects horizontally from a rotatable support 18 mounted to swing on the horizontal axis to permit circular adjustment of the work holder. The work may be secured at any one of a plurality of positions on the U-shaped fixture 17.

Although the construction of the work holder has not been described in greater detail, it is nevertheless considered to be a feature of one phase of our invention. It will be noted that the adjustment of the work holder longitudinally of base 14 for focusing, can be made by swinging the lever 20 and that adjustment transversely of the base 14 and transversely of the optical axis, can be had by rotating the screw 21. The vertical adjustment is attained by rotating the shaft 22 to operate the bevel gears shown in dotted lines in Figure 3. One of the gears is in threaded engagement with a vertical feed shaft. The extent of angular or circular adjustment of the work holder about the axis 19 may be indicated by an arcuate scale 23 associated with a vernier 24.

The grinding wheel 3 is mounted on the column 2 so that it can be elevated or lowered for engagement with the work piece 16. This is accomplished by suitable manipulation of a control member such as a hand wheel 25. It is more desirable to provide means generally indicated at 26 and accessible at the front of the frame 1 for adjusting this grinding wheel and comprising the hand wheel, the shafts and bevel gears shown in Figure 2. In this instance two means for this purpose may be considered to have been provided.

The saddle 6 can be moved back and forth on the ways 5 by means of a hand wheel 27 in order to bring the work piece into proper relation with the grinding wheel 3. Another hand wheel 28 is provided at the front of the machine adjacent the hand wheel 27 and serves for obtaining by hand a longitudinal or traversing motion of the table 11 along the ways 8 and 9. The control 28 is made inoperative during grinding, at which time 11 and 14 are automatically moved in unison by means now to be described.

In one use of our invention a reciprocating movement is imparted to the machine table 11, and for this purpose there is provided an electric motor 30 on the base which drives an eccentric disk 31 through suitable reduction gearing not shown. The eccentric 31 is connected with the saddle 6 by means of a link or connecting rod 32 so that rotation of the eccentric will produce the desired reciprocation of the machine table 11. The link 32 is connected with the saddle 6 by means of a block 33 to which one end of the link 32 is pivoted. This block is adapted to be adjustably clamped at any position along a rail 34 mounted on the saddle. A positioning stop 35 is provided for the block 33 and is adapted to be clamped to the rail 34 at a desired point so that the machine table, and therefore the work piece, can be quickly moved to or returned to its proper position relative to the grinding wheel 3 by simply actuating the hand wheel 28 to cause the block to engage the stop. Variations in length of stroke can be had by changing the position of the eccentric pin on the eccentric 31.

The device herein is particularly well adapted for grinding very hard metals, such as "carbides," and is particularly useful in profile grinding of hard metals. A very thin diamond wheel is used for the fine finishing of such metals and an operation known as "bump" grinding is performed, which consists in progressively briefly engaging the grinding wheel consecutively at different points along the contour of the work. This is only one of the many uses to which our invention can be put, but it is a valuable use.

The base 14 carries or supports the entire optical system of our invention, as well as the work, and the motor by which the machine table and base are reciprocated. This optical system includes a translucent screen and means adapted to project a clearly defined magnified shadow of the periphery of the work onto said translucent screen. This screen extends from the front of the machine at a position near the front controls, so that the operator standing at said controls 26, 27 and 28 is close to the screen and therefore can accurately and with a minimum of effort observe the shadow cast thereon and compare it with the enlarged profile master drawing which is placed on the screen.

This optical system comprises a suitably enclosed light source generally indicated at 36, which is preferably an incandescent lamp. A condenser lens 37 is suitably associated with the source of light.

At the opposite side of the work are suitable objective lenses and prisms contained in a holder or casing 38. One form of objective and prism system is diagrammatically shown in Figures 4 and 5, in which the lens is indicated at 39, and two prisms, respectively at 40, 41. The magnified shadow-image is received by a mirror 42, by which it is reflected onto the translucent screen indicated at 43. The system of the prisms of Figures 4 and 5 is commonly known as a Porro-prism system and is for the purpose of obtaining the proper relation of the image to the work. Although the specific arrangement of our optical system is a feature, there is, of course, no intention to be entirely limited to the character of elements of the system, since any elements which will give clear definition and allow for proper focusing will serve.

The elements of the optical system should include a source of light associated with a collector lens located at one side of the work. At the opposite side of the work there should be disposed an objective by which the profile shadow of the work and tool is magnified, for projection onto a mirror. The elements of the system thus far described are aligned in direction of reciprocation of the base 14, and this is a feature of the invention.

The position of the screen 43 is to be particularly noted. It extends from the front of the machine at a position laterally of and near the controls of the machine, so that an operator positioned at the controls can easily and accurately observe the relation of the magnified work and tool shadows to the enlarged drawing or delineation on the screen.

The optical system is ordinarily enclosed in a housing to exclude such extraneous daylight and/or other illumination as would "dilute" the cone of light that extends from the objective lens to the screen by way of the mirror. For the sake of clarity this housing has been omitted, but it will be understood that it is to be used and the application of such a housing is within the skill of the art. With our arrangement of the optical elements the cost of the housing is considerably less than the cost of the housings of the ordinary comparing machine.

The light source 36 is enclosed within a suitable casing 44. In this instance the lamp is adapted to be supplied with current from a transformer carried by the base 14 and generally indicated at 45. It has not been thought necessary to show the electrical connections since these are well known in the art. The light casing 44 is mounted by means of legs, but may be mounted in any suitable manner. The casing is raised by the legs so as to permit of ventilation which is needed because of the high operating temperature of such light sources. This also permits the work holder control lever 20 to be pivoted and operate at a point beneath the casing 44.

The condenser lens 37 is arranged in a tubular extension 46 of the lamp housing 44 and serves to direct substantially parallel light rays toward and across the work piece. The housing 44 has fins to assist in radiating the heat of the light source. A transparent plate 47 is located between the tube 46 and the work piece 16 to prevent injury to the lens by metal or other particles resultant from cutting or grinding action of the tool, in this case the wheel 3. This is a feature.

The objective lens and prisms contained in the holder 38 project an enlarged image of the work onto the screen 43 by reflection from the mirror 42. The lens and prism holder 38 is mounted on a suitable structure indicated at 48. The structure 48 is mounted upon a suitable pad indicated at 49. The mirror 42 is adjustably mounted on suitable pad indicated by the numeral 51, of the base 14.

The translucent screen generally has the form of a plate of ground glass. An enlarged outline 52 or profile scale drawing, corresponding to the outline desired to be given to the work, is placed on the screen. This outline is commonly made on translucent paper, and the paper is applied to the glass and suitably held. The shadow of part of the cutting tool 3 is also projected onto the screen in relation to the drawing 52. The screen, in this instance, is carried by a rectangular frame 53, and this frame is attached to a ring 54. The ring is rotatable on suitable rollers 55 (see Figure 6), and these rollers are carried by a bracket 56 which is secured as at 57 to the pad 49 of the base 14. The periphery of the ring 54 is graduated as shown at 60 and a pointer 61 is provided on the bracket. These details are features. It will be noted that by means of the ring 54 the screen can be adjustably rotated to bring the enlarged drawing in register with the projected shadow of the work 16.

In the operation of our machine the work piece 16 is suitably secured to the holder, in this instance by connecting it to the fixture 17 of the circularly adjustable element 18 (see Figure 3). The work is properly adjusted to bring it into the field of the optical system and to bring it into proper relation to the tool or grinding wheel. After all necessary preliminary adjustments have been made, including that of the block 33, the electric motor 30 is started to cause motion or reciprocation of the table 11 and base 14.

Since the entire optical system is mounted on the base 14 and moves therewith in fixed relation with the work, a clear image of the tool at point of and during contact with the work piece is continuously projected upon the screen 43, and neither tool nor work can ever accidentally move out of the optical field during the shaping operation, whatever the amplitude of motion of the work may be. The operator is in a position to accurately constantly observe the work and its projected shadow-image because he is close to both. He is also close to the controls 27 and 28 so that proper adjustments of the wheel or of the saddle may be made.

Since a profile image of the work and cutting tool are continuously projected onto the screen 43, the greatest accuracy results from being able to constantly observe at close range the relation of the work and tool shadows to the delineation 52 of the screen as shaping proceeds.

We believe it is entirely new to provide a tool holder and a shadow screen which are complementally circularly or angularly adjustable for the purpose herein. It will be noted that our machine can grind either convex or concave surfaces, curved or angularly related, and that with our optical system, correspondingly shaped magnified shadows can be produced and made to appear on the ground glass. Cutting or shaping by grinding are obtained by properly manipulating the machine controls, for example to vertically adjust the grinding wheel or to move the work inwardly or outwardly horizontally, in this case in a direction parallel with the rotative axis of the wheel. This particular process is known as "bump" grinding and, of course, the work is thereby so cut or shaped as to make its magnified contour shadow conform to a master outline on the screen.

Horizontal surfaces of the work are ground by manipulating only the cross-feed for obtaining in and out movement of the machine table, and for each successive horizontal pass of the work the grinding wheel is minutely lowered until the work shadow finally conforms to or registers with the corresponding horizontal master profile line on the screen. By a similar technique a vertical surface is ground by a succession of up and down passes of the grinding wheel, and after each vertical pass the table is minutely adjusted inwardly or outwardly by means of the cross-feed control, until the work shadow is made to finally register with the corresponding vertical line on the master delineation of the screen. It is thus seen that the technique of "bump" grinding consists of the proper cooperative control of two movements, that is, the vertical movement of the wheel and horizontal movement of the work. No limitation of the invention is intended by the remarks just made, because the invention is broader than the particular method of manipulating the tool and work.

Of the several operations mentioned, the grinding of a horizontal surface is the easiest and most natural. Therefore, if any angular surface that is to be ground can be brought to a horizontal position it is desirable to do so. This can be accomplished by our circularly adjustable work or tool holder. We rotate the holder the desired amount and the shadow projection of the desired surface of the work swings into a horizontal position. As a result of this motion the shadow on the screen rotates away from the screen line we are "shooting at" and it becomes necessary to so rotate the screen as to bring the corresponding line of said screen into a horizontal position. Thus, the angular surface may be, in a sense, treated as a horizontal one.

This invention involves a method which is believed to be independent of the structure, in that we believe ourselves the first to mount an optical system, used for the purpose herein, so that the entire system and the work can move in unison in relation to the cutting tool or, in this particular embodiment, to a grinding wheel.

In one phase of this invention the optical system moves while the tool is cutting, that is, during the metal-shaping operation. This is to be distinguished from movement of the optical system when the tool is not cutting. We also believe it entirely new to move a shadow-projecting optical system and the work in fixed focus relation as a unit toward the tool for the purpose of engaging the work with the tool. In either case focusing is accomplished before movement of the tool, and before grinding begins. Thereafter both the optical system and the work can be moved to engage the work with the tool and/or to move the work after engagement with the tool. We also believe it new to place the optical system and work on a board-like support and thereafter locate that support so that the optical axis is transverse to the operator and so that the optical system is in front of the tool and near front manual controls, which controls are adapted to move the tool and adjust the board-like support in relation to the tool, either in a direction transverse to the optical axis or in a direction parallel with that axis.

The location of the screen is important. It is arranged laterally of and near the controls, at and near the side of an operator as he stands with and faces the controls and faces the tool and work. This screen overhangs the floor. The screen is arranged in upright position so that it is not in the way. The screen is close to the operator's eyes, as is the upfaced surface of the work being operated upon. The meeting point of the tool and work is close to the operator's eye and so is the screen image of that meeting point.

We also believe it entirely new to place a shadow screen of ground glass in the front of the machine. Also we believe it new to place the screen close to the eyes of the operator as he stands with his hands on or near the controls, and so that when in such position he can therefore easily inspect the work itself, as well as easily maintain registration of the work shadow with the master profile drawing.

Insofar as we are aware, it is entirely new to provide an attachment for the purpose herein which can be applied to a conventional grinding machine without any substantial modification of the machine. Moreover, it is believed to be entirely new to so construct an optical projection system for the purpose herein that its shadow-receiving screen can be placed at the front of any metal-working machine and laterally of an operator as he stands near the front of the machine with his hands on the controls.

We also believe it entirely new to have the screen reciprocate in a direction transverse to the rotative axis of a grinding wheel, and further believe it entirely new to have the screen face somewhat in the direction of motion of the work. We further believe it entirely new to have the screen located at the side of the operator and faced in such a position in relation to both the operator and the mirror that only a single mirror is required.

At this time in the history of our country it is particularly desirable to be able to equip the now existing ordinary types of grinding machines with devices for the purpose herein, rather than to make an entirely new machine having this device incorporated therein. It is also of great advantage to have an attachment of the kind herein which can be easily placed on the machine when needed and which can be as easily removed when not needed, so that the conventional machine can be used in the ordinary manner for such grinding as may not require shadow-image reproduction of the profile of the work.

Where the degree of magnification is such that the entire profile cannot be in the optical field at one and the same time, the master profiles are made up as separate sections. The scheme may be referred to as "zoning," and in such a case each separate delineation corresponds to only the optically included part of the total outline of the work piece. In this case the work is adjusted as often as may be necessary to bring the various portions of its contour into the optical field.

While we have described our improvement in considerable detail, it will be understood that we do not wish to be entirely limited to the details but regard the invention as being applicable by the employment of equivalents even though the parts may be structurally modified. The invention, of course, may include such changes and modifications as do not involve a departure from the spirit of the invention and the scope of the appended claims. It is conceivable that within the scope of the invention the position of the screen may be changed to lie to the left of the operator, or may be placed directly in front of him in a raised position, yet still adapted to move in unison with the work and the optical system.

What we claim is:

1. In combination with a machine having a cutting element, a base attached to the machine for reciprocation, a work holder on the base having means adapted for adjusting the work in relation to said cutting element, an optical system and a translucent screen entirely carried by said reciprocable base, said system being adapted to project a magnified shadow of the periphery of work held by said holder onto said translucent screen, and means for reciprocating the base in relation to the cutting element.

2. In combination, a base mounted in operative relation to a cutting element of a machine tool for reciprocation, a work holder on the base having means adapted for angularly adjusting it in relation to the cutting element, an optical system and a translucent screen entirely carried by said base, said reciprocable system being adapted to project a magnified shadow of the periphery of work held by the holder onto said translucent screen, and means by which said screen can be angularly adjusted in correspondence to the angular adjustment of the work holder.

3. An attachment for a machine tool of the kind having a rotating tool and a traversing table, comprising a second table adapted to be reciprocably mounted on the traversing table, means for causing reciprocation of said second table, a work holder on the second table and movable therewith for engaging a work piece with said tool, said work holder being adapted for angularly positioning the work piece, a screen having thereon an enlarged outline of the finished work piece, image-projecting means on the second table adapted to continuously project an enlarged image of the work piece onto said screen, and means for rotatably mounting said screen on said second table.

4. In combination with a grinding machine, a work holder and means by which it is circularly adjustable, an optical system adapted to project a magnified periphery of the work onto a shadow-screen, and means by which the screen is circularly adjustable complementally in relation to the circular adjustment of the work holder, and means by which said holder and optical system and screen can be moved, as a unit, and in shadow-projecting relation in relation to a grinding tool of said grinding machine.

5. A machine of the class described comprising, a work holder, a rotatable tool adapted to have its lower periphery operate on work held by the holder, a shadow-projecting optical system including a screen, the optical axis of the entire system lying in a horizontal plane which is substantially tangent to the periphery of the tool during shaping of the work, the shadow-projecting system including a light source and an objective spaced in direction of said horizontal optical axis, and said work holder lying intermediately of said light source and objective, the tool when operating on the work being adapted to rotate at point of contact with the work in a direction away from the objective and toward the light source, whereby particles released during the shaping operation are moved horizontally in a direction away from the objective and toward the light source, and transparent means interposed between the work holder and the light source to protect the light source.

6. A device of the class described, comprising a base, a rotative grinding tool on the base, a mount reciprocable on the base in relation to the tool, an optical system on the mount adapted to cast an enlarged shadow of a part of a workpiece onto a shadow screen and including a light source and a shadow screen, a motor on the mount having a crank, a bar on the base stationary with respect to the mount, a block slidable on the bar, means for releasably securing the block to the bar, and a connecting rod pivoted at opposite ends respectively to crank and block.

7. A device of the class described, comprising a base, a tool on the base, a mount on the base movable in relation to the tool, an optical system on the mount adapted to cast an enlarged shadow of a part of a workpiece and including, a light source, a work support, an objective, and a mirror, including a support projecting laterally of the mount, a ring rotatable in an upright plane and about an axis coincident with the optical axis of the optical system, and a shadow screen carried by said ring and in optical relation with the mirror.

8. A device of the class described including, a bed, a shadow-producing optical system having a shadow screen, a work holder, a tool and plural means for separately controlling movements and operation of the tool including means at the front of the bed; in which the optical system and the work holder are both mounted on a horizontal board-like table which is disposed at the front of the bed and near the front control means for controlling tool movements and operation, and in which the optical axis of the system is horizontally disposed and in which the shadow screen is disposed in a vertical plane laterally of and near and facing the front controls, and in which the tool can be made to approach the holder and work from the rear and made to operate on an upwardly faced surface of the work as held by the holder, the arrangement of the work support, front control means and screen being such that when an operator is either seated or standing at said front controls he is close to and can easily observe the meeting point of the tool with the said upfaced surface of the work and is close to and can easily observe on the shadow screen by simple rotation of his head, an image of the meeting point of the tool with that upfaced surface.

9. An attachment adapted to be applied to a conventional grinding machine which has a rotating tool, a carrier adapted to move toward and away from the tool, and means for controlling the tool and carrier motions including controls at the front of the machine, comprising; an elongated board-like table and means for attaching the table to the carrier for horizontal reciprocation in a direction transverse to the direction of motion of the carrier, said table having thereon a shadow-projecting optical system including a shadow screen, the optical axis of said system being adapted to be horizontal when the table is attached to the carrier, a work holder also on said table adapted to hold work in the optical axis, and means for reciprocating said table after its attachment to the carrier, said screen being so disposed on the table that when the table is attached to the carrier the face of said screen lies in a vertical plane and at a point immediately adjacent and lateral to said controls.

10. A device of the class described, comprising a tool, a work piece on which the tool operates, a shadow-producing optical system, and means for continuously moving the work piece and the optical system as a unit while the tool is operating on the work piece.

CARL A. BERGSTROM.
WALTER C. BERGSTROM.
OSCAR C. HEDIN.
EDMUND W. PENNINGTON.